United States Patent [19]
Savoldi et al.

[11] Patent Number: 5,727,146
[45] Date of Patent: Mar. 10, 1998

[54] SOURCE ADDRESS SECURITY FOR BOTH TRAINING AND NON-TRAINING PACKETS

[75] Inventors: Mark Savoldi, Lincoln; Alan R. Albrecht; Lisa S. Brown, both of Granite Bay, all of Calif.

[73] Assignee: Hewlett-Packard Company, Palo Alto, Calif.

[21] Appl. No.: 658,191

[22] Filed: Jun. 4, 1996

[51] Int. Cl.$^6$ ............................................. G06F 11/00
[52] U.S. Cl. ............................................. 395/187.01
[58] Field of Search ............................. 395/186, 187.01, 395/182.02; 380/3, 25, 48, 49, 4; 370/401, 432, 457, 392, 360, 368

[56] References Cited

U.S. PATENT DOCUMENTS

| | | | |
|---|---|---|---|
| 5,161,192 | 11/1992 | Carter et al. | 380/48 |
| 5,311,593 | 5/1994 | Carmi | 380/23 |
| 5,414,694 | 5/1995 | Crayford et al. | 370/13.1 |
| 5,430,726 | 7/1995 | Moorwood et al. | 370/85.11 |
| 5,450,073 | 9/1995 | Brown et al. | 340/825.07 |
| 5,521,913 | 5/1996 | Gridley | 370/58.2 |
| 5,537,099 | 7/1996 | Liang | 340/825.07 |
| 5,539,737 | 7/1996 | Lo et al. | 370/60 |
| 5,560,038 | 9/1996 | Haddock | 395/800 |
| 5,561,662 | 10/1996 | Kakuma et al. | 370/17 |
| 5,568,613 | 10/1996 | Futral | 395/200.02 |
| 5,590,201 | 12/1996 | Lo | 380/49 |

OTHER PUBLICATIONS

IEEE Std. 802.12–1995, "Demand Priority Access Method, Physical Layer" pp. 22–30, 57–67.

*Primary Examiner*—Robert W. Beausoliel, Jr.
*Assistant Examiner*—Joseph E. Palys

[57] ABSTRACT

Network access to a port is secured by monitoring the source address of packets that are sent as a device tries to train to the port over the network. If the source address matches an authorized source address assigned to the port to which the device is attached, then the device is allowed access to the system. If the device tries to train with a source address different from the authorized address, then the device is not allowed to train into the network, and all packets sent by the device are denoted as errored packets to prevent them from being accepted by any other device in the network. The system also detects when a device tries to disguise itself by first training with an authorized source address and then sends a packet with an unauthorized source address. If a packet is received which contains a source address other than the one that the device is authorized to use, the packet is marked as invalid so that it is not accepted by any other device in the network. The unauthorized device is then required to re-establish its connection to the network by retraining to guarantee that it is the authorized device.

16 Claims, 6 Drawing Sheets

| DA | SA | Req Config | Allow Config | data | FCS |

DA = destination address (6 octets)
SA = source address (6 octets)
Req Config = requested configuration (2 octets)
Allow Config = allowed configuration (2 octets)
Data = data (594 to 675 octets)
FCS = frame check sequence (4 octets)

Fig. 4 (PRIOR ART)

| R | P | P | F | F | r | r | r | N | C | D | v | v | v |

R = repeater bit           N = access not allowed bit
PP = promiscuous bits      C = configuration bit
FF = format bits           D = duplicate address bit
r = reserved (set to 0)    vvv = version bits

SOURCE ADDRESS SECURITY FOR BOTH TRAINING AND NON-TRAINING PACKETS

BACKGROUND OF THE INVENTION

1. Technical Field

The invention relates to computer networks. More particularly, the invention relates to a technique for preventing devices from sending packets over a computer network, where such packets contain unauthorized source addresses.

2. Description of the Prior Art

The IEEE 802.12 standard provides a training mechanism where a device is not allowed access to a network until it has been trained. In previous network protocols, for example standard Ethernet (i.e. IEEE 802.3), there is no such thing as training. In such system, a device has immediate access to the network, and may therefore start sending information as soon as it is connected.

Training allows transceivers on either side of the network cabling to equalize their internal phase-lock loops and analog logic so that the transceivers operate in as noise-free environment as they possibly can. Training also allows a device associated with each transceiver to identify its function to the network.

Some problems resulting from application of known training techniques include:

Network Access for Devices with Invalid Source Addresses.

Current networking systems have no way of allowing access to a network based solely on the source address of the device requesting access. They must use other means which are much more simplistic in their view of network security.

For example, S. Carter, T. Lockyer, C. Gahan, *Repeaters For Secure Local Area Networks*, U.S. Pat. No. 5,161,192 (3 Nov. 1992) disclose a multiport repeater for a local area network installation that includes means for storing access rules for the items of equipment connected to it. The repeater reads a portion of each frame, which may be all or part of the destination address segment and/or of the source address segment and/or of the control segment of each incoming data frame, or a frame or protocol identifier incorporated into opening bytes of the data segment, and compares the data that it reads with the stored access rules to determine whether the frame is permitted or not. If not, the repeater modifies the frame which it is in the course of retransmitting, for example by overwriting it with meaningless digits or encrypting it. The repeater may also report to the network controller the source address, destination address, and reason for deciding to modify the frame.

Network Access for Packets with Invalid Source Addresses.

Current networking systems have no way of preventing devices from sending packets over the network which contain unauthorized source addresses.

It would be advantageous to provide a network security technique that exploited the device training procedure provided by such protocols as those set forth in the IEEE 802.12 and other standards by monitoring the information that is generated by a device during a training period, and thereby provide a security function, e.g. based on the source address of the device itself.

SUMMARY OF THE INVENTION

The invention provides a technique that allows network access to a device by monitoring the source address of the packets being sent as the device tries to train into the network. (Note: The term training, as used herein, primarily refers to the IEEE 802.12 standard definition thereof.) If the source address matches the authorized source address assigned to the port to which the device is attached, then the device is allowed access to the system. If the device tries to train with a source address that is different from the authorized address, then the device is not allowed to train into the network, and all packets sent by the device are denoted as errored packets to prevent them from being accepted by any other device in the network.

The invention also provides a technique for detecting when a device tries to disguise itself by first training with an authorized source address and then sends a packet with an unauthorized source address. If a packet is received which contains a source address other than the one that the device is authorized to use, the packet is marked packet as invalid so that it does not go to any other device in the network. The unauthorized device is then required to re-establish its connection to the network by retraining to guarantee that it is the authorized device.

Some advantages of the invention include:

Unauthorized packets are marked as invalid to prevent them from causing damage within the network.

Devices which send unauthorized source address packets are forced to re-establish their connection to the network.

Access is permitted for devices with authorized source addresses only.

All packets are monitored for authorized source addresses, not just the initial network connection packets.

DETAILED DESCRIPTION OF THE INVENTION

One preferred embodiment of the invention operates, for example, in conjunction with a repeater device or a networked hub, to which other devices are trying to connect. Such repeater device has a typical architecture that includes a CPU connected to a hub, where a network administrator can access the hub using a management program. During network operation, the network manager sets up a secure address on a per port basis and writes an address into the repeater device that identifies the only address that is allowed to connect to the node at which the repeater device is located. In this way, the port is secured such that, when another device tries to train on that port, the repeater device logic compares the other device's address, makes sure that the other device address matches, and then allows the other device to access the network. From that point on, the repeater device monitors every packet that comes from the other device to assure that the other device does not switch its address mid-stream and cause a security violation.

Figure 1:
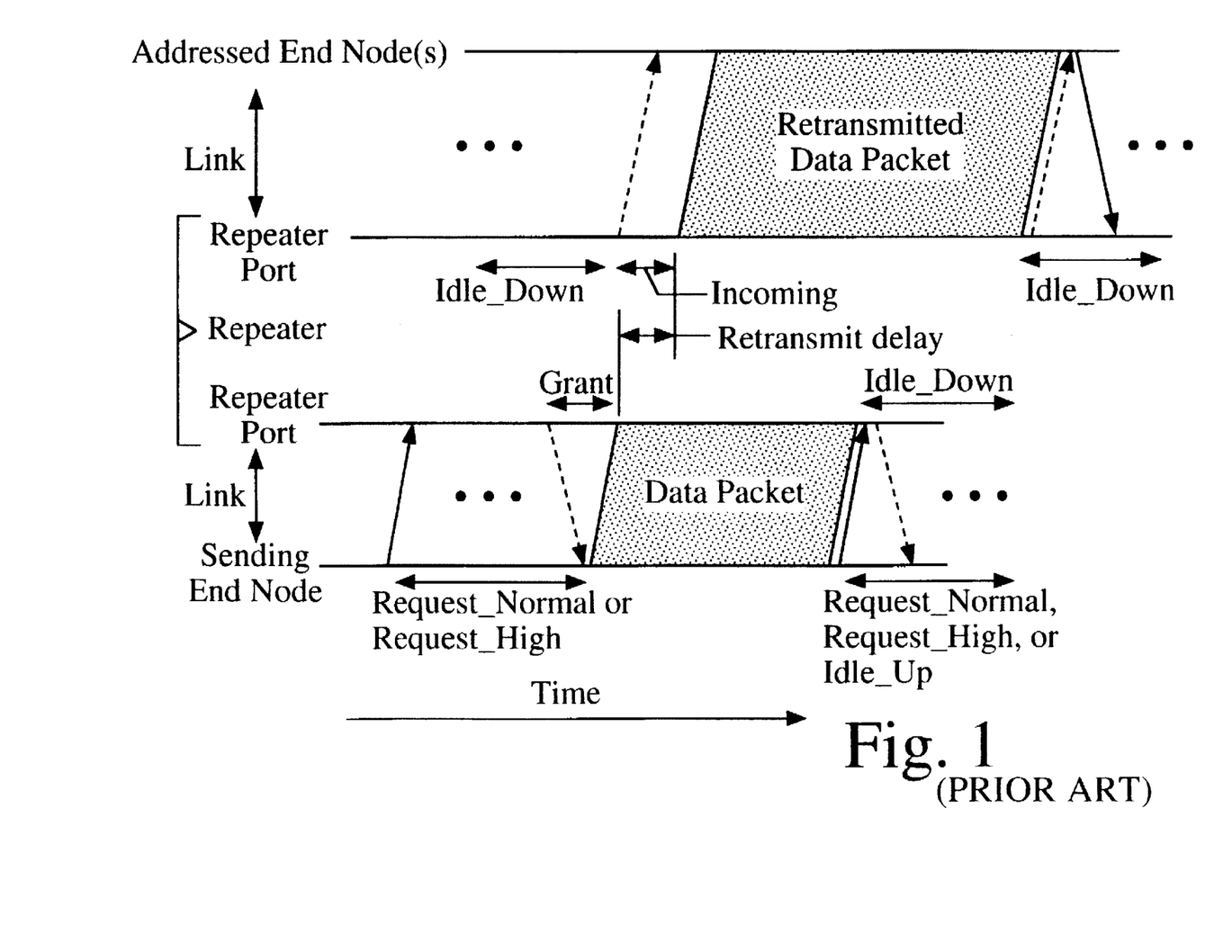
FIG. 1 is a time-space diagram of the operational sequences encountered when a packet is sent using the 802.12 protocol.

The preferred embodiment of the invention is preferably practiced in conjunction with IEEE standard 802.12. FIG. 1 is a time-space diagram of the operational sequences encountered when a packet is sent using the 802.12 protocol. The space between the horizontal lines represents the link between the repeater and the connected end nodes (or repeaters). Control signals between the repeater and the end node are shown as single arrows indicating the direction of the signal. For clarity, signals sent by the end node are shown as solid lines and signals sent by the repeater are shown dashed lines. The specific control signal is identified by the indicated signal name and the duration of the signal is identified by the horizontal arrow. The different spacing between the repeater and the end nodes indicates the possibility of different link distances. The slope of the transmitted control signals and data packets depicts the propagation delay in the link.

Figure 2:
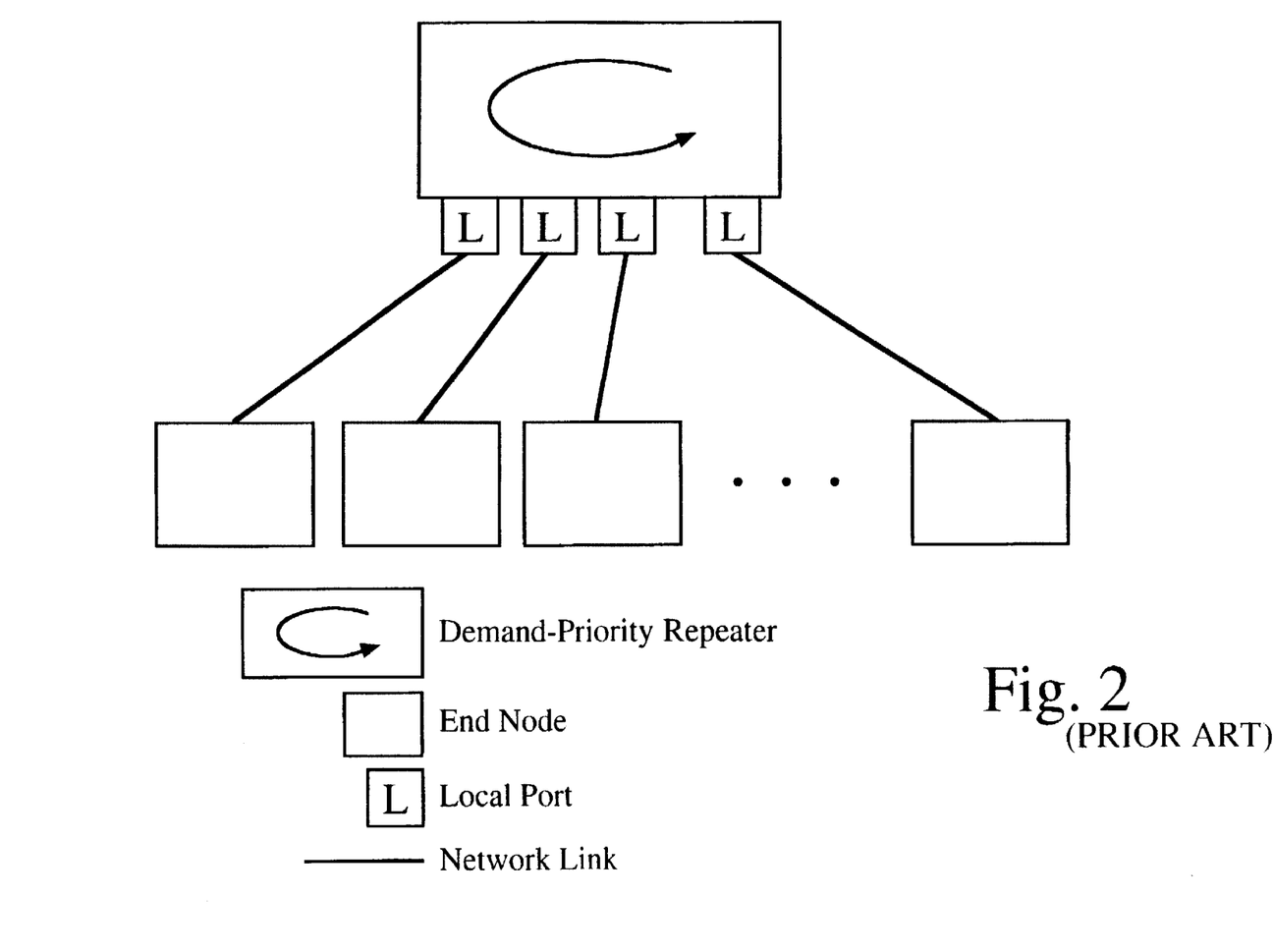
FIG. 2 is a block diagram showing a single repeater network topology.
Figure 3:
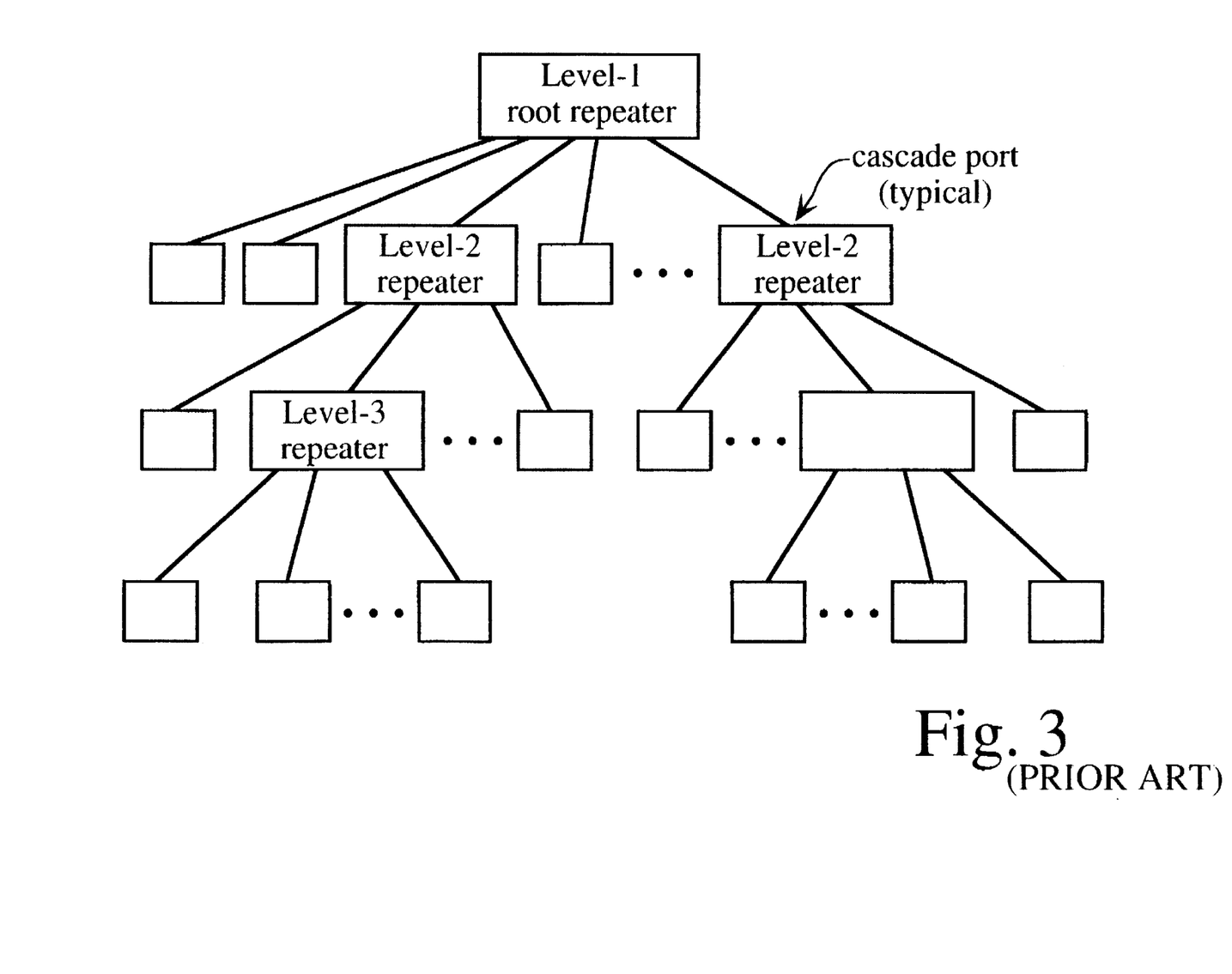
FIG. 3 is a block diagram showing a multilevel cascaded network topology.

FIG. 2 is a block diagram showing a single repeater network topology. The simplest network structure contains one repeater and two or more end nodes. Larger topologies can contain several levels of repeaters interconnected in a cascade, as shown in FIG. 3. Each repeater is typically connected to one or more end nodes and can be connected to one or more repeaters. Lower level repeaters and end nodes are connected to local ports. Higher level repeaters must be connected to a cascade port. Interconnection between two repeaters using only local ports is not allowed. The topmost repeater in the cascade is designated as the Level-1 repeater. Repeaters in each succeeding lower level in the cascade are designated by the number of links between them and the root repeater by the equation:

repeater level=(number of link segments away from the root repeater)+1

All repeaters on the same level are designated with the same level number.

A link training sequence is required in the IEEE 802.12 protocol to verify the cable quality for data transmission, to allow the receiver to adapt to the link, and to establish the end node's address. Training is performed each time a link is logically established, e.g. power-up and cable connection. Training is also performed when certain error conditions are detected.

Link training is always initiated by the lower entity (the training initiator), which can be either an end node or a lower repeater. The upper repeater can force training to be initiated by disabling the link. Training is accomplished by sending a series of special training packets in each direction between the end node and the repeater. Training frames are sent to all repeaters to alert them that training is in progress somewhere on the network. During training, the end node sends a Training_Up signal in place of an Idle_Up signal, and the repeater sends a Training_Down signal in place of an Idle_Down signal.

Figure 4:
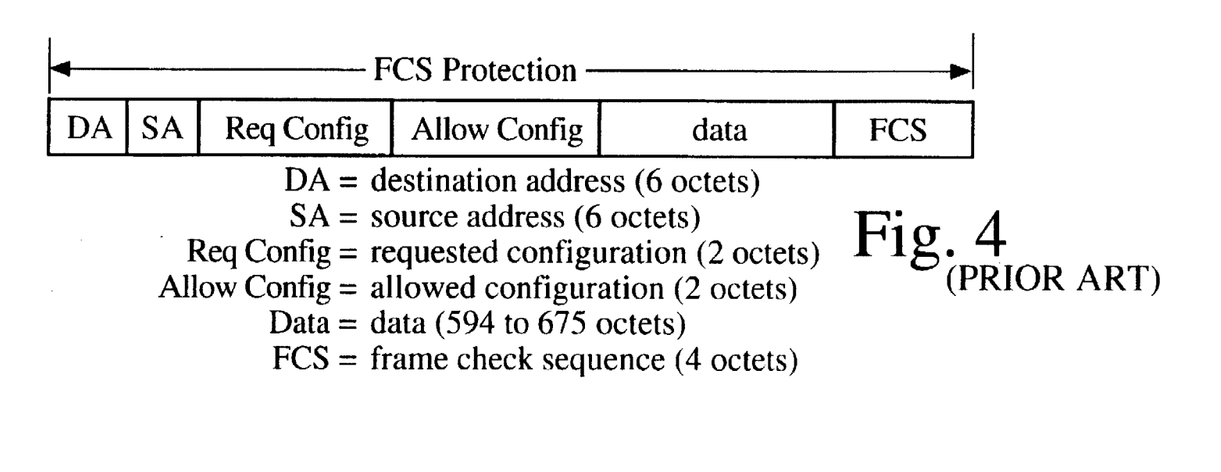
FIG. 4 shows the IEEE 802.12 training frame format.

Training frames are special MAC frames that are used only during link initialization. Training frames are initially constructed by the MAC (or the RMAC) in the end node (or repeater) at the lower end of a link. Training frames are forwarded to all network repeaters. FIG. 4 shows the IEEE 802.12 training frame format.

Part of the link initialization process is to establish the network address of the connected lower entity that is initiating the training session. If the lower entity is an end node, the source address is the individual address of the end node, unless a non-null individual address has not yet been assigned to the end node. In the latter case, the link may be tested by training with the null address. The end node is not allowed to join the network until a non-null address is assigned.

If the lower entity is a repeater, the source address is normally the null address. If the repeater contains an integrated Layer Management Entity (LME) with an assigned non-null individual address, the repeater may train with that address.

An end node may train with a null address to verify link operability, but training is not successfully completed until the end node has trained with an assigned individual address.

Figure 5:
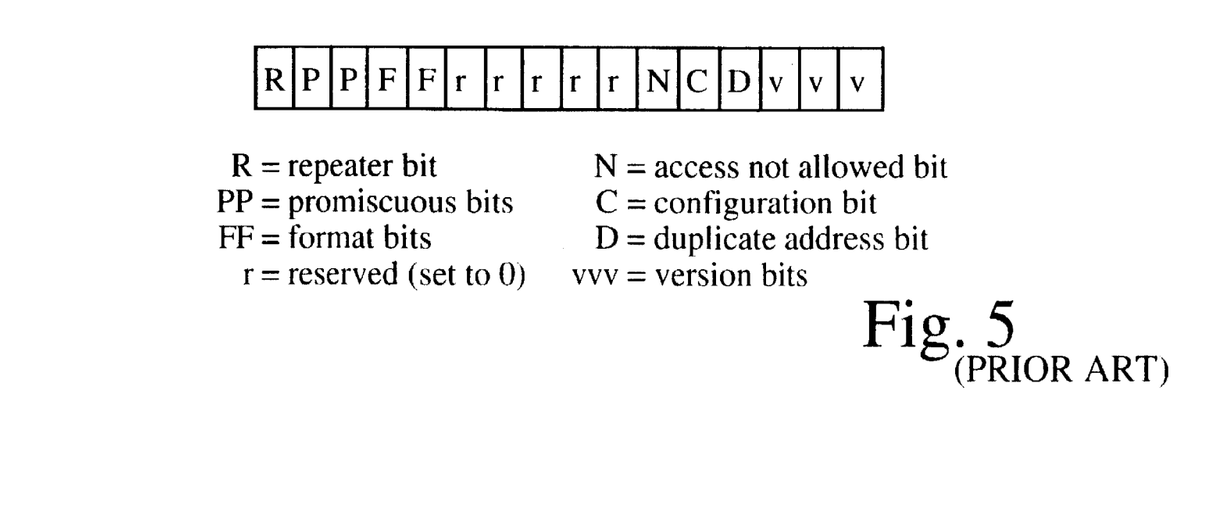
FIG. 5 shows the allowed configuration field format.

The allowed configuration field permits the connected higher level repeater to respond with the allowed configuration. FIG. 5 shows the allowed configuration field format. The training initiator (the lower entity) sets the contents of the allowed configuration field to zero.

The N bit is provided for private use to allow the repeater to indicate that the lower entity is not allowed to join the network for reasons other than configuration, e.g. because of security restrictions.

N=0, access is allowed only if the configuration is compatible with the network.

N=1, access is not allowed, even if the configuration is compatible.

Use of the N bit is optional in the IEEE 802.12 protocol. If the N bit is not used, it is set to zero.

Figure 6:
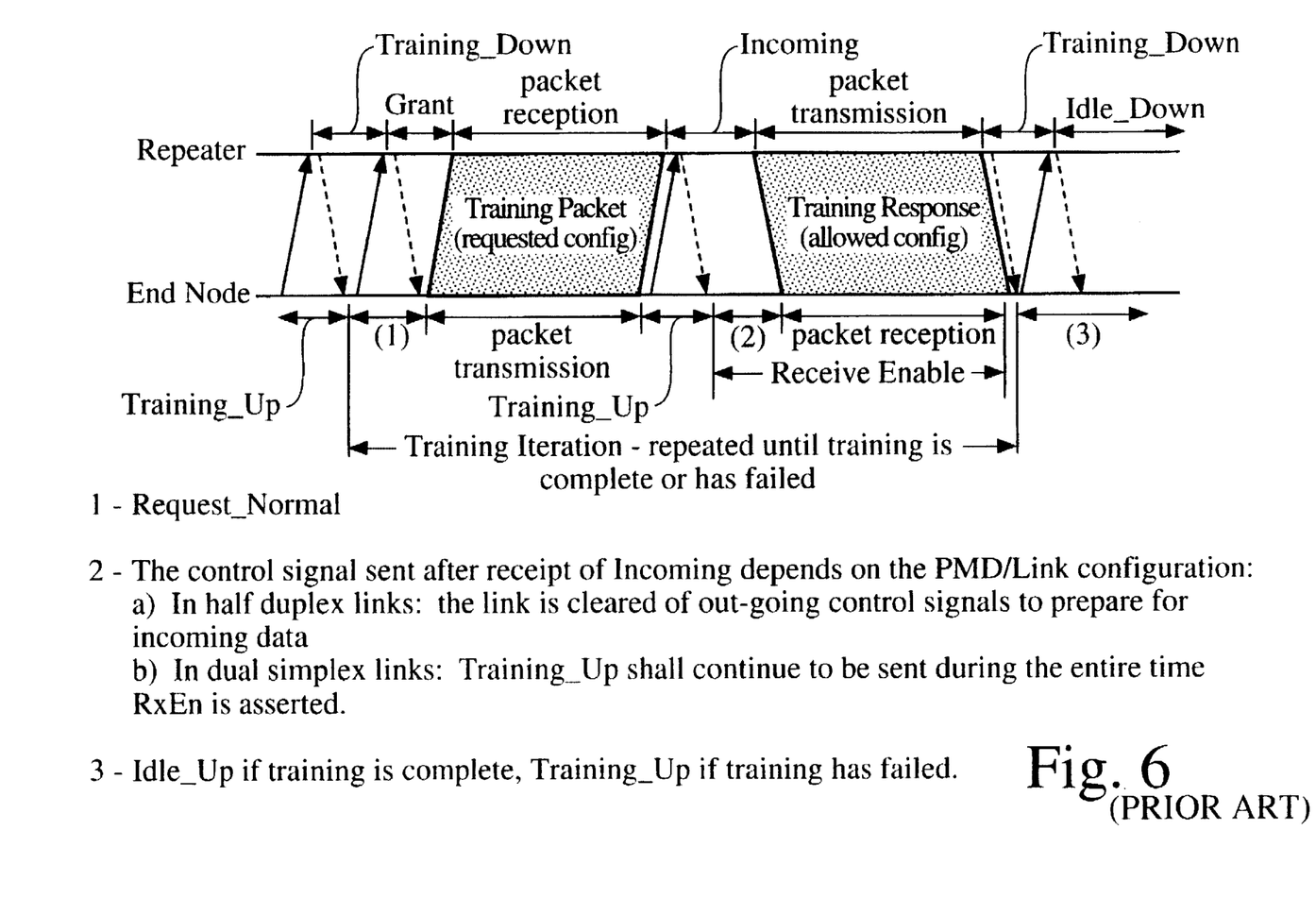
FIG. 6 is a time-space diagram of a link training sequences in accordance with the 802.12 protocol.

The link must be initialized each time the end node is powered up or whenever an error condition indicates that the link may not be operating correctly. Training is initiated by the end node and is accomplished by the successful exchange of training frames with the repeater as depicted in FIG. 6, which is a time space diagram.

The training process begins with the end node requesting training by generating a PMI_CONTROL.request (Training_Up) primitive. Training begins with the receipt of a PMI_CONTROL.indication (Training_Down) primitive and continues until a series of consecutive training frames (training iterations in FIG. 6) have been successfully exchanged between the end node's MAC and the repeater's RMAC sublayers.

If 24 consecutive packets are received without error, the C and N bits are zero after the last packet and the MAC is then trained with an assigned address. The MAC indicates success by generating a PMI_CONTROL.request (Idle_Up) primitive, rather than a PMI_CONTROL.request (Request_Normal) after the last training packet is received. The MAC then transitions to the active state upon receipt of a PMI_CONTROL.indication (Idle_Down or Incoming) primitive.

If training fails, the MAC waits for 1-2 second delay and then initiates a new training sequence.

The end node does not send nor receive normal data traffic while training is in progress.

Figure 7:
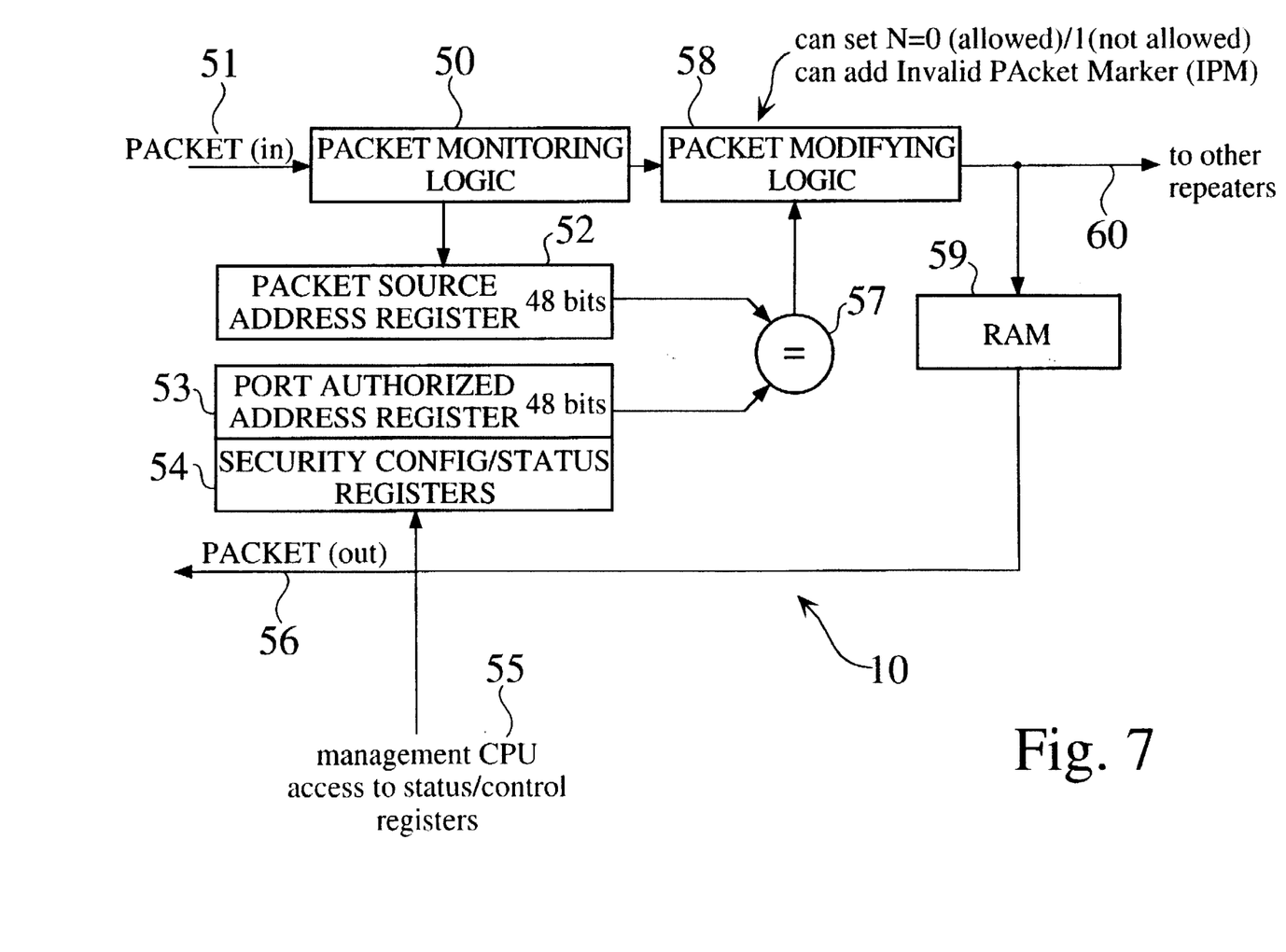
FIG. 7 is a block schematic diagram of a system for setting source address security for both training and non-training packets, for example in the IEEE 802.12 protocol, according to the invention.

FIG. 7 is a block schematic diagram of a system for setting source address security for both training and non-training packets, for example in the IEEE 802.12 protocol, according to the invention. A port 10 includes packet monitoring logic 50 that receives numerous packets 51 via a network connection. A packet source address register 52 decodes the packet source address. A port authorized address register 53 stores an authorized source address, which may be set by use of various security configuration and status registers 54 under the control of a network management CPU 55.

The packet source address and authorized source address are compared in a comparator 57. If the source address is authorized, then the remote device is allowed to train to the port and the packet is forwarded as appropriate to other repeaters 60. If the source address is not authorized, i.e. the source address does not match the authorized address, then the system may employ packet modifying logic 58 to perform various modifications to the packet, such as setting the N bit (discussed above) to one, i.e. not allowed, or adding an Invalid Packet Marker (IPM). The packet so modified may then be placed in a memory such as the RAM 59, and returned to the source 56.

The IEEE 802.12 standard defines the training function in terms of a series of packets that are sent back and forth from the remote device, the end node, another repeater, or to the repeater device itself. As discussed above, for a remote device to pass training it must send 24 error-free packets. The remote device must also receive an indication back from the repeater device that indicates whether or not it was allowed access as desired. This indication may include a not-allowed bit that is set whenever the security address does not match the address with which the remote device is trying to train.

Thus, when a remote device attempts to connect to a port in a router, a hub, repeater or some other device on the network, there is a training procedure where the such devices train to each other to show that they can actually communicate. Once the devices have established that they can communicate successfully, then a link is established. The invention allows a network administrator to set any port to respond only to a device at a secured address that can train to the port and no other device can train to the port. Thus, the invention provides a technique that monitors each packet that arrives at the port during the training procedure to determine if, in fact, the device training to the port is either an allowed device or not an allowed device. If the device is an allowed device, then the training is completed and the device is able to use the port. If the device is not an allowed device, then training is stopped and the device is not allowed to train to the port.

If the device is not allowed, then device stays in the training sequence, i.e. the device tries to train, finds out it cannot train, pauses, and then tries to train again over and over.

The invention is useful for such network security applications as restricting access to a server where there are several ports into the server. The invention is also useful if an attempt is made to connect an unauthorized analyzer to a network. If an unused network connection were located, an analyzer would not be allowed to connect to the system because that port has an address associated with it that would not match the analyzer. Thus, the invention is useful to prevent snooping.

The system is dynamically configurable in that the allowed addresses are not set in the repeater device's registers when the system is powered up. If, however, the device is already trained on a network but the port is not yet secured, the device can be secured by turning on the security bit.

A typical hub has a number (N) of ports, where each port is accessible by a number of devices. The presently preferred embodiment of the invention allows the herein described security technique to be applied to one address, although alternative embodiments of the invention may use the CPU on the repeater device to apply a multiple number of methods of actually learning that address.

For example, when a remote device tries to train to the repeater device, the address that the remote device is trying to train with is stored in a holding register. Thus, if the repeater device did not know the address of the remote device to be secured on a port, the system could turn on the security feature but write the address to a bogus value that has never been used before for training. When the device is trying to train, the repeater device can read that address that the device is trying to train as and determine if the device is authorized. The repeater device then sets the authorized address to match the remote device's trained address.

An alternative embodiment of the invention provides a pool of addresses that the CPU stores in the repeater device's memory, e.g. that there are M different addresses that are allowed on any of the repeater device's M ports. If a remote device tries to train and the port is secured with a bogus address, the device cannot train, but the repeater device can check the address that the remote device is trying to train with against one of the M addresses. If it matches, then the repeater device allows the remote device to train by setting that address, i.e. the authorized address, on that port.

The following provides an explanation of a presently preferred implementation of the invention in a six port repeater circuit, although the invention is readily applicable to a repeater circuit having any desired number of ports:

Security is implemented using a set of registers identified as:

SECURED[5:0], AUTHADDR0[47:0] through AUTHADDR5[47:0],

SECVIO[5:0], SECVIO_CAM[5:0], SECVIO_REP[5:0], SECVIO_PRO[5:0], and

VIOADDR[47:0].

Only six ports can generate security violations. The uplink port does not in any case cause a security violation.

The above identified registers are described as follows, where in each such register read/write access is with respect to the CPU:

SECURED[5:0] (Read/Write)

Security Enable

Set bit 0–5 to 1 to enable security for the corresponding port 0–5.

AUTHADDR0[47:0] (Read/Write if SECURED or Read Only if not SECURED)

Port 0 Authorized Address

If port 0 is SECURED, this is the address at which port 0 is allowed to train.

If port 0 is not SECURED, this is the last address at which port 0 successfully completed training.

This register is writable only if the port is SECURED.

AUTHADDR1[47:0] (Read/Write if SECURED or Read Only if not SECURED)

Port 1 Authorized Address

If port 1 is SECURED, this is the address at which port 1 is allowed to train.

If port 1 is not SECURED, this is the last address at which port 1 successfully completed training.

This register is writable only if the port is SECURED.

AUTHADDR2[47:0] (Read/Write if SECURED or Read Only if not SECURED)

Port 2 Authorized Address

If port 2 is SECURED, this is the address at which port 2 is allowed to train.

If port 2 is not SECURED, this is the last address at which port 2 successfully completed training.

This register is writable only if the port is SECURED.

AUTHADDR3[47:0] (Read/Write if SECURED or Read Only if not SECURED)

Port 3 Authorized Address

If port 3 is SECURED, this is the address at which port 3 is allowed to train.

If port 3 is not SECURED, this is the last address at which port 3 successfully completed training.

This register is writable only if the port is SECURED.

AUTHADDR4[47:0] (Read/Write if SECURED or Read Only if not SECURED)

Port 4 Authorized Address

If port 4 is SECURED, this is the address at which port 4 is allowed to train.

If port 4 is not SECURED, this is the last address at which port 4 successfully completed training.

This register is writable only if the port is SECURED.

AUTHADDR5[47:0] (Read/Write if SECURED or Read Only if not SECURED)

Port 5 Authorized Address

If port 5 is SECURED, this is the address at which port 5 is allowed to train.

If port 5 is not SECURED, this is the last address at which port 5 successfully completed training.

This register is writable only if the port is SECURED.

SECVIO[5:0] (Read Only)

Security Violation Notification

If a bit is 1, the corresponding port caused a security violation. This register is a logical OR of the SECVIO_CAM, SECVIO_REP, and SECVIO_PRO registers. To clear it, the aforementioned registers must be read.

SECVIO_CAM[5:0] (Read Only)

CAM (Address) Security Violation Notification

If a bit is 1, the corresponding port caused a security violation by using an invalid address.

Cleared on read.

SECVIO_REP[5:0] (Read Only)

Repeater Security Violation Notification

If a bit is 1, the corresponding port caused a security violation by requesting to be configured as a repeater but not repeater enabled.

Cleared on read.

SECVIO_PRO[5:0] (Read Only)

Promiscuous Security Violation Notification

If a bit is 1, the corresponding port caused a security violation by requesting to be configured as promiscuous but not promiscuous enabled.

Cleared on read.

VIOADDR[47:0] (Read Only)

Violating Address

Last address to cause a security violation. Set with SECVIO_CAM if the port was trained.

If a bit in the SECURED register is set to 1, the corresponding port is considered secured, or security enabled. To enable security for any port, the following procedure is used:

Disable the port (PORTEN[n]=0).

Enable security (SECURED[n]=1).

Write the authorized address (AUTHADDRn).

Enable the port (PORTEN[n]=1).

Note that the authorized address cannot be written until the port is first secured. The default power-on setting is no security. This allows non-managed or non-secured systems always to be allowed to operate without net management intervention.

Security Disabled

If security is not enabled for a port, then any source address except for the null address, is allowed to train on that port. A port is allowed to train using the null address only if the port is requesting to train as a repeater and it is repeater enabled. Upon completion of any non-errored training packet, the port address is written to the corresponding CAM location. Upon completion of any training sequence, the address in the CAM is written to the corresponding AUTHADDR register, and the "aTrainedAddressChanges" counter for that port is incremented by one.

Security Enabled

When security is enabled, the only address that is allowed to pass training is the authorized address, as indicated in the AUTHADDR0 through AUTHADDR5 registers. These 48 bit registers contain the address authorized to be used on the corresponding port. Note that each authorized address register corresponds to a specific. port. That is, port 0 is only allowed to train with AUTHADDR0, not AUTHADDR1 or AUTHADDR5. See the Security Using a "Pool of Addresses" section below for one way to implement a group of authorized addresses that are not port specific.

It is important to note that upon completion of any non-errored training packet, the port address is still written to the corresponding CAM location, as in the security disabled case. Hence, if management software wants to determine what address is trying to train on a port, it can read the corresponding CAM location. Upon completion of any training sequence, the address in the CAM should match the corresponding AUTHADDR register, and the "aTrainedAddressChanges" counter for that port is incremented by one.

Violations

The CAM detects a security violation if a port tries to send a packet with a source address different from the authorized address (AUTHADDR0–AUTHADDR5). If a security violation occurs, the bit in the SECVIO_CAM register corresponding to the port causing the security violation is set. This is also reflected in the SECVIO register, because it is a logical OR of the three security violation source registers. If a violation occurs during a training packet, the port is not allowed to pass training. If the violation occurs during a non-training packet, an Invalid Packet Marker (IPM) is added to the packet, the port is caused to retrain, and the address causing the violation is put into the VIOADDR register. NOTE: The violating address is written to the VIOADDR register on non-training packets only.

Address Learning

A method is needed to allow a network administrator to enable security for all ports without being forced to go around to each end node and find its address. To accomplish this, there are two methods which could be used to learn the addresses of end nodes attached to the various ports of the repeater without violating network security.

Loose Security

The first method is used for a network being brought up for the first time when initial security was not that important. The network powers up and all ports are allowed to train and start running without any security enabled. Network management software then sets the corresponding security enable bit. Because the last trained address is written into the authorized address register, there is no need to write it when enabling security in this case.

One problem with this method, however, is that for a short period of time, any address is allowed in the network, and could permanently be given access if that address is stored as the authorized address. However, it does allow the network to come up and run without any delay, with all ports getting secured in sequence.

Tight Security

A second method is preferably used in a network where complete security is desired on initial network configuration. Using this method, as soon as the hub completes its reset cycle, net management software disables all ports (PORTEN=000000b), secures them (SECURED=111111b), and re-enables them (PORTEN=111111b), regardless of whether there are end nodes attached to the ports. This is accomplished by performing a net management write using global addressing (NMADDR[15:12]=0h). On reset, the authorized address for unused ports is set to the null address with the global (I/G) bit set to one (AUTHADDRn= 800000_000000h). When a new end node is added to the system, the end node attempts to train with an address different from the authorized address, and is not allowed access. Note that if it tries to train with the null address, it is not allowed access either, because the global (I/G) bit is set in the authorized address. Any end node trying to train causes a security violation (SECVIO_CAM(port)=1b). However, because the end node sent valid training packets, its address is stored in the CAM. Net management software then uses the procedure described previously to read the CAM address, disable the port, enable security, put that address in the corresponding authorized address, and re-enable the port. The end node then passes training, and the port is secured with the end node's address.

Security Using a "Pool of Addresses"

In some networks, the network administrator might know all the addresses allowed in the network, but not really care to which port a particular end node is attached. In this case, there is a "pool of addresses" which are valid addresses in the network. To preserve security for such a network, a method similar to the second method described in the Address Learning section above is preferably used. When the hub is brought out of reset, all ports are secured (SECURED=111111b). As each end node attempts to train, net management software individually reads the CAM address and compares it to the "pool of addresses." If the address matches one of the addresses in the pool, that address is denoted as used in the pool and the authorized address for that port is set to that address. The end node then passes training and is allowed onto the network. Using this procedure, each end node is allowed to pass training only if its address is one of the pool that was not used by another end node. End nodes trying to train with addresses other than those in the "pool of addresses," or with an address in the pool that is already used, continue to try to train without ever passing.

Other Sources of Security Violations

There are two other scenarios which can cause security violations. Both of these come from invalid requests during training. First, if an end node requests to be a repeater but the port to which it is attached is not repeater enabled (REPEATER(port)=0b), then the corresponding bit in the SECVIO_REP register is set. Second, if an end node requests to be promiscuous and not a repeater, but the port to which it is attached is not promiscuous enabled (PROMISCEN(port)=0b), then the corresponding bit in the SECVIO_PRO register is set. NOTE: In both of these case the violating address register (VIOADDR) is not set because it was not an invalid address which caused the violation.

Management software can easily monitor all three sources of security violations by polling the SECVIO register. When any bit is set, management software reads the other three resisters to determine which source or sources caused the violation. The process of reading each of the three source registers should clear the SECVIO register, unless another security violation occurs during the reads.

Although the invention is described herein with reference to the preferred embodiment, one skilled in the art will readily appreciate that other applications may be substituted for those set forth herein without departing from the spirit and scope of the present invention. For example, it will be appreciated by those skilled in the art that the invention prevents an unauthorized device from flooding a network with packets because the invention imposes a training period upon the device for each unauthorized packet sent by the device. Accordingly, the invention should only be limited by the Claims included below.

We claim:

1. A method for securing network access to a port, comprising the steps of:

monitoring a source address of packets that are sent by a device to a port over a network;

allowing access to said port if said source address matches an authorized source address assigned to said port to which said device is attached;

not allowing access to said port if said source address of said device does not match an authorized source address assigned to said port to which said device is attached, wherein all packets sent by a device having an unauthorized source address are treated as errored packets to prevent them from being accepted by any other device in said network;

detecting when a device tries to disguise itself by first training with an authorized source address and then sending a packet having an unauthorized source address;

marking said packet as invalid so that it does not get accepted by any other device in the network if said packet contains a source address other than a source address that said device is authorized to use; and requiring said device to re-establish its connection to said network by retraining to assure that it is an authorized device.

2. The method of claim 1, further comprising the step of:

comparing said source address with said authorized address during a device training sequence.

3. The method of claim 1, further comprising the step of:

setting said authorized address with a network management function.

4. The method of claim 1, further comprising the step of:

enabling security by setting a security mode wherein only an authorized source address is allowed to train to said port and, alternatively, disabling security by setting a security disabled mode wherein any source address is allowed to train to said port.

5. The method of claim 1, further comprising the step of:

providing a loose security mode in which:

the network is powered up and all ports are allowed to train and start running without any security; and a security mode is then set.

6. A method for securing network access to a port, comprising the steps of:

monitoring a source address of packets that are sent by a device to a port over a network;

allowing access to said port if said source address matches an authorized source address assigned to said port to which said device is attached;

not allowing access to said port if said source address of said device does not match an authorized source address assigned to said port to which said device is attached, wherein all packets sent by a device having an unauthorized source address are treated as errored packets to prevent them from being accepted by any other device in said network; and providing a tight security mode in which:
all ports are disabled on initial network configuration;
said ports are secured;
said ports are reenabled;
on reset, an authorized address for unused ports is set to a null address;
storing a source address, but refusing a connection, when an unauthorized end node attempts to train to a port; and
upon management authorization, either enabling said port or disabling said port.

7. The method of claim 1, further comprising the steps of:
assigning a pool of authorized addresses to a plurality of ports;
marking an address as used if a device source address matches an address in said pool of addresses; and
setting an authorized address at a port to which said device is attached; wherein only source addresses that match addresses within said pool of addresses are authorized.

8. The method of claim 1, further comprising the step of:
monitoring sources of security violations by polling a register associated with said port.

9. An apparatus for securing network access to a port, comprising:
packet monitoring logic for monitoring a source address of packets that are sent by a device to a port over a network;
a port authorized address register for allowing access to said port if said source address matches an authorized source address assigned to said port to which said device is attached, said port authorized address register not allowing access to said port if said source address of said device does not match an authorized source address assigned to said port to which said device is attached; and
packet modifying logic for treating all packets sent by a device having an unauthorized source address as errored packets to prevent them from being accepted by any other device in said network;
wherein said port authorized address register detects when a device tries to disguise itself by first training with an authorized source address and then sends a packet having an unauthorized source address;
said packet modifying logic marking said packet as invalid so that it is not accepted by any other device in the network if said packet contains a source address other than a source address that said device is authorized to use;
said apparatus further comprising means for requiring said device to re-establish its connection to said network to assure that it is an authorized device.

10. The apparatus of claim 9, further comprising:
a comparator for comparing said source address with said authorized address during a device training sequence.

11. The apparatus of claim 9, further comprising:
at least one security configuration and status register for setting said authorized address with a network management function.

12. The apparatus of claim 9, further comprising:
at least one security configuration and status register for enabling security by setting a security mode wherein only an authorized source address is allowed to train to said port and, alternatively, disabling security by setting a security disabled mode wherein any source address is allowed to train to said port.

13. The apparatus of claim 9, further comprising:
at least one security configuration and status register for providing a loose security mode in which:
the network is powered up and all ports are allowed to train and start running without any security; and
a security mode is then set.

14. An apparatus for securing network access to a port, comprising:
packet monitoring logic for monitoring a source address of packets that are sent by a device to a port over a network;
a port authorized address register for allowing access to said port if said source address matches an authorized source address assigned to said port to which said device is attached, said port authorized address register not allowing access to said port if said source address of said device does not match an authorized source address assigned to said port to which said device is attached;
packet modifying logic for treating all packets sent by a device having an unauthorized source address as errored packets to prevent them from being accepted by any other device in said network; and
at least one security configuration and status register for providing a tight security mode in which:
all ports are disabled on initial network configuration;
said ports are secured;
said ports are reenabled;
on reset, an authorized address for unused ports is set to a null address;
a source address is stored, but a connection is refused, when an unauthorized end node attempts to train to a port; and
upon management authorization, either said port is enabled or disabled as requested.

15. The apparatus of claim 9, further comprising:
a management function for assigning a pool of authorized addresses to a plurality of ports;
at least one security configuration and status register for marking an address as used if a device source address matches an address in said pool of addresses; and
means for setting an authorized address at a port to which said device is attached; wherein only source addresses that match addresses within said pool of addresses are authorized.

16. The apparatus of claim 9, further comprising:
a management function monitoring sources of security violations by polling a register associated with said port.

* * * * *